United States Patent [19]
Chenot

[11] 3,927,180
[45] Dec. 16, 1975

[54] METHOD OF CONVERTING BRUSHITE TO MONETITE CRYSTALS WITH CONTROLLED VARIATION IN CRYSTAL HABIT

[75] Inventor: Charles F. Chenot, Towanda, Pa.

[73] Assignee: GTE Sylvania Incorporated, Stamford, Conn.

[22] Filed: Nov. 29, 1974

[21] Appl. No.: 528,140

Related U.S. Application Data

[63] Continuation of Ser. No. 313,356, Dec. 8, 1972, abandoned.

[52] U.S. Cl............. 423/308; 252/301.4 P; 23/304
[51] Int. Cl.²...................... C01B 25/32; B01D 9/02
[58] Field of Search.................. 23/300, 293 R, 304; 423/312, 158, 160, 155, 308, 307; 252/301.4P

[56] References Cited
UNITED STATES PATENTS

| | | | |
|---|---|---|---|
| 2,914,380 | 11/1959 | Vickery | 423/307 |
| 2,946,656 | 7/1960 | Schreurs | 423/308 |
| 3,068,067 | 12/1962 | Aia | 423/308 |
| 3,095,269 | 6/1963 | Chiola | 423/308 |
| 3,353,903 | 11/1967 | Cremer | 423/307 |
| 3,368,867 | 2/1968 | Lapidus | 252/301.4 P |
| 3,395,979 | 8/1968 | Schafer | 23/304 |
| 3,401,014 | 9/1968 | Saeman | 423/307 |
| 3,420,625 | 1/1969 | Margolis | 423/308 |
| 3,505,012 | 4/1970 | Dale | 252/301.4 P |
| 3,539,291 | 11/1970 | Chiola | 423/308 |
| 3,549,553 | 12/1970 | Wachtet | 252/301.4 P |
| 3,578,603 | 5/1971 | Dale | 252/301.4 P |
| 3,635,660 | 1/1972 | Bruce | 252/301.4 P |
| 3,654,173 | 4/1972 | Thomas | 252/301.4 P |
| 3,654,174 | 4/1972 | Dale | 252/301.4 P |

Primary Examiner—Norman Yudnoff
Assistant Examiner—S. J. Emery
Attorney, Agent, or Firm—Norman J. O'Malley; William H. McNeill; Cyril A. Krenzer

[57] ABSTRACT

Control of pH and temperature allows conversion of brushite to monetite of specific crystal habit: e.g., rectangular (needle) having a basal plane acute angle of approximately 90°; thin rectangular (plate) having a basel plane acute angle of approximately 84°; rhombohedral (plate) having a basal plane acute angle between 84° and 63°; and rhombohedral (diamond) having a basal plane acute angle of approximately 63°. In addition to habit, particle size distribution (PSD) and most frequent size (size) can be varied in a controlled manner.

4 Claims, 1 Drawing Figure

PARTICLE SIZE DISTRIBUTION OF CaHPO₄

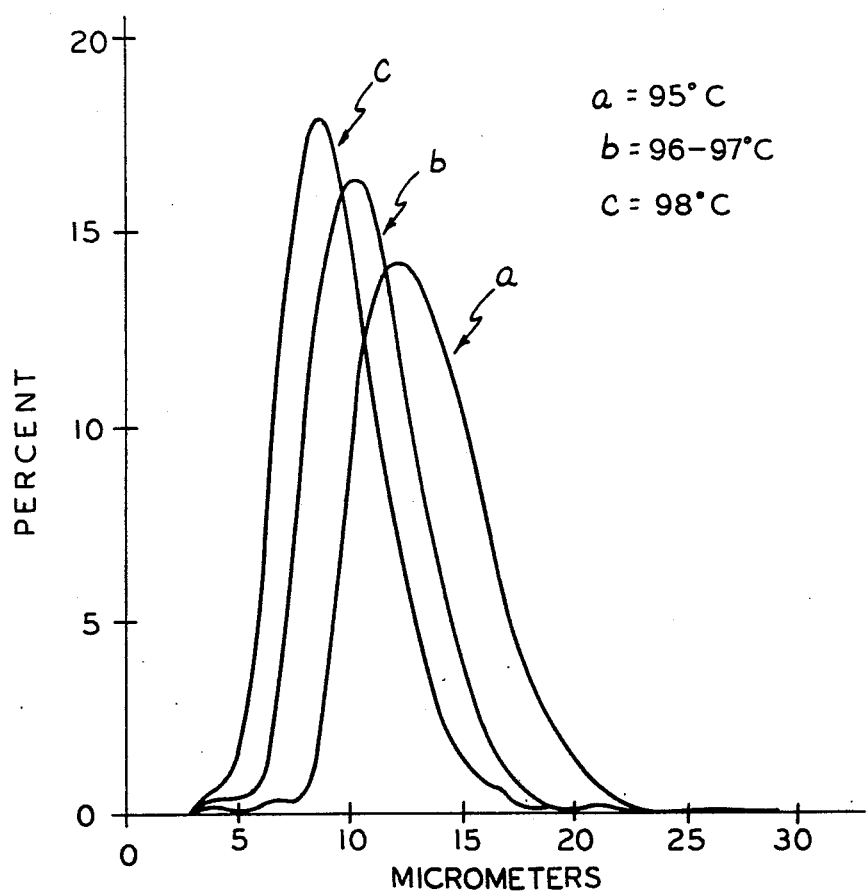
PARTICLE SIZE DISTRIBUTION OF CaHPO₄

METHOD OF CONVERTING BRUSHITE TO MONETITE CRYSTALS WITH CONTROLLED VARIATION IN CRYSTAL HABIT

CROSS-REFERENCE TO RELATED APPLICATION

This application is a continuation of Ser. No. 313,356, filed Dec. 8, 1972, now abandoned.

BACKGROUND OF THE INVENTION

This invention relates to the preparation of raw materials employed in the manufacture of calcium halophosphate phosphors which are used in fluorescent lamps. Specifically, it relates to a novel process for converting brushite ($CaHPO_4 \cdot 2H_2O$) to monetite ($CaHPO_4$) with control of crystal habit, particle size distribution and size.

Phosphors with the general formula $Ca_{10}(F,Cl)_2(PO_4)_6$: Mn:Sb are used extensively in fluorescent lamps. Because these phosphors are coated as a thin film on the inside of the lamp tube the optical physics of the layer is an important consideration in producing an efficient lamp. In past development work calcium halophosphate phosphors with a certain optimum, narrow PSD have appeared to provide the best high lumen-low powder coating weight combination. Also indicated from past experience is the apparent dependence of the phosphor habit, PSD and size on the habit, PSD and size of the $CaHPO_4$ raw material. This dependence places a considerable importance on the quality of this single raw material in view of its being a major constituent in the manufacture of these phosphors.

Generally, $CaHPO_4$ is prepared via a temperature dynamic process involving a programmed heating of a reaction vessel containing a $CaHPO_4 \cdot 2H_2O$ slurry. The actual conversion of $CaHPO_4 \cdot 2H_2O$ to $CaHPO_4$ crystals is quite endothermic and, depending on the initial slurry pH, occurs around 80°–90°C. Normally the pH range of the slurry is between 3–5 depending on the type of crystal habit desired. For example, at lower pH values a diamond plate habit is formed, whereas, at higher pH values a more square, rhombic plate habit is formed. This diamond versus rhombic characterization of the habit can be related to the basal plane acute angle; the diamond habit corresponds to an angle around 63° and the rhombic habit to an angle around 83°. Because the temperature dynamic process offers little control over the conversion process, materials with varying and moderately broad PSD are produced normally.

In addition to habit variance, the temperature at which the conversion actually occurs can have an effect on the crystal size and PSD. Because the reaction rate is directly dependent on the temperature at which conversion actually occurs, crystal size and PSD can vary over a wide range. This can be related to the general observation that slow crystallization processes at low temperatures produce normally larger crystals than faster processes at higher temperatures.

In view of the limited control over the conversion kinetics and the lack of thermal homogeneity in a reaction vessel, because of thermal and mixing gradients during the dynamic heat-up, one would expect limited control over habit, PSD, and size. This limited control is observed, in fact, in large batch (1000–2000 gallon reactors), temperature dynamic processes and can account for at least part of the quality variance observed in the final phosphor.

In the lighting industry, emphasis on forcing every possible degree of efficiency out of fluorescent lamps containing calcium halophosphate phosphors, has encouraged continued development of the raw materials, especially $CaHPO_4$. Development of new processes involving continuous synthesis of $CaHPO_4$ and involving surfactant control of the $CaHPO_4$ precipitation is described in recent literature. Both of these processes are concerned with forming $CaHPO_4$ crystals of a desired size and within a narrow size distribution of about 3–20 μm. This narrow distribution is based on the concept that substantial fine material (<3μm) has a deleterious effect on the phosphor by affecting the sintering during firing and substantial coarse material lowers the fluorescent efficiency of the thin layer of resulting phosphor by affecting its optical physical characteristics.

OBJECTS AND SUMMARY OF THE INVENTION

It is, therefore, an object of this invention to obviate the disadvantages of the prior art.

It is another object of the invention to improve the performance of fluorescent lamps through control of the raw materials utilized in the manufacture of phosphors therefor.

A still further object of the invention is the provision of a method for manufacturing such raw materials with control of crystal habit, PSD and size.

These objects are accomplished in one aspect of the invention by the provision of a method which emphasizes control of pH and temperature to produce specific crystal habit, PSD and size of the monetite crystal. It is believed that such a method provides a distinct advance in the art.

BRIEF DESCRIPTION OF THE DRAWING

The single FIGURE graphically illustrates the temperature dependence of particle size for the rectangular (needle) habit of monetite.

DESCRIPTION OF THE PREFERRED EMBODIMENTS

For a better understanding of the present invention, together with other and further objects, advantages and capabilities thereof, reference is made to the following disclosure and appended claims in conjunction with the above-described drawing.

Referring now to the invention with greater particularity, the conversion process involved is actually the thermal dehydration of $CaHPO_4 \cdot 2H_2O$ to $CaHPO_4$ which is promoted normally by a temperature dynamic method. During this heat-up period, a gel-like phase forms which, if properly dispersed, breaks down endothermically accompanied by subsequent crystal formation of $CaHPO_4$. The gel phase is thought to be some composition in the generalized formula for calcium hydroxy apatite,

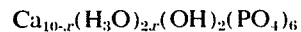

$$Ca_{10-x}(H_3O)_{2x}(OH)_2(PO_4)_6 \qquad (1)$$

The value of $x$ varies from $x=0$ (hydroxy apatite) at high pH conditions, $x=2$ (octacalcium phosphate) at moderate pH conditions, to $x=4$ (the stoichiometry for $CaHPO_4 \cdot 2H_2O$) at low pH conditions. The thermal stability of the gel phase is pH dependent with high thermal stability (>100°C) at high pH conditions and low thermal stability (80°–35°C) at low pH conditions.

The present method was developed to provide pH and temperature control and to take advantage of this thermal stability of the gel phase. A pH is chosen such that the gel remains stable at a given temperature. The process in not temperature dynamic, but isothermal within a narrow tolerance of ±0.5°C. Once the isothermal condition is achieved, the pH is lowered to the desired pH for conversion and held constant by steady-state pH control during the complete conversion reaction. Because the conversion is accompanied by a gradual pH rise the steady-state condition is simply a controlled input of acid (normally phosphoric acid) at a rate necessary to maintain the desired pH to within ± 0.1 pH unit.

Habit appears to be primarily a function of pH over a narrow and well defined pH range. Table I summarizes the variation in habit as a function of pH and temperature. In addition, Table I includes the basal plane acute angle characteristics of each habit type.

PSD appears to be a function of the conversion temperature tolerance with adherence to very tight tolerance giving rise to very narrow PSD.

TABLE I

PH AND TEMPERATURE DEPENDENCE OF CRYSTAL HABIT

| Habit | Basal Plane Acute Angle | Conversion pH | Temp. |
|---|---|---|---|
| Rectangular (needle) | ~90° | ≥4.0 | 98° |
| Thin Rectangular (plate) | ~84° | 3.5 | 92° |
| Rhombohedral (plate) | 84–63° | 3.5—3.0 | 88° |
| Rhombohedral (diamond) | ~63° | ≤3.0 | 85° |

Size appears to be a function of temperature and the degree of agglomeration just prior to conversion for any given habit desired. The conversion kinetics seem to be temperature dependent with large crystals forming during slower reaction rates at temperatures a few degrees below those in Table I and small crystals formed during faster reaction rates at temperatures a few degrees above those in Table I.

Concerning agglomeration, the stabilized gel phase can be destroyed prematurely without conversion to $CaHPO_4$ by the formation of so-called star clusters. These agglomerates convert eventually, but contribute to an undesired coarse tail in the PSD. To minimize the agglomeration surfactants or dispersing agents are recommended. Surfactants such as the Airco "Surfynol" and Minnesota Mining and Manufacturing "Fluorad" brands seem to be quite effective at concentrations in the $CaHPO_4.2H_2O$ slurry of about 100 ppm. Other brands should be equally effective.

Some characteristic PSD data of laboratory preparations involving these controls are shown in the accompanying drawing. These preparations represent rectangular (needle) habit and illustrate the temperature dependence of size as summarized in Table II.

TABLE II

TEMPERATURE DEPENDENCE OF SIZE FOR RECTANGULAR (NEEDLE) $CaHPO_4$

| Curve in Figure | Mode (Size) | Actual Conversion Temp. |
|---|---|---|
| a | 12.5 μm | 95°C |
| b | 11 μm | 96–97°C |
| c | 8 μm | 98°C |

The following specific example describes the preparation of $CaHPO_4$ characterized by the rectangular (needle) habit and discussed in the accompanying drawing and Tables I and II. This example is offered as a method of preparation and is not intended to limit the claims.

EXAMPLE

The reaction vessel is a 1-liter Pyrex reaction kettle equipped with a heating mantle controlled by a Barber-Colman Chronotrol program controller. The temperature rise program is approximately 2°C/minute up to the desired conversion temperature at which point the equipment is switched to temperature hold with about ± 0.5°C tolerance.

One liter of normally prepared $CaHPO_4.2H_2O$ slurry (about 10% solids by weight in $H_2O$) adjusted to pH=4.5 is placed in the reaction kettle equipped with a propeller stirrer. The following steps are necessary to convert this slurry to $CaHPO_4$:

A. Adjust slurry with about 10 ml dilute $NH_4OH$ stock solution to pH=9. (Stock solution prepared by diluting 1:1 28.6% $NH_3$ assay reagent with water).

B. Add 0.1 gram surfactant, e.g., Fluorad Lot FX-170.

C. Begin heat-up cycle and monitor pH with temperature compensated pH meter. Continue to add stock $NH_4OH$ as needed to keep pH=5.5 ± 0.2. This will require about 22 ml additional stock $NH_4OH$ up to the conversion temperature.

D. Upon reaching conversion temperature of 98 ± 0.5°C allow to stir for 2–3 minutes.

E. Begin slow titration of dilute $H_3PO_4$ stock solution to pH=4.0 ± 0.1. (Stock solution prepared by diluting 1:1 85.8% $H_3PO_4$ assay reagent with water).

F. Upon reaching pH=4.0 acid titration is adjusted in such a manner that the slurry pH varies less than ± 0.1 pH units. This is the steady-state condition referred to earlier.

G. The reaction is complete when continued acid titration lowers pH permanently below 4.0. The reaction should be complete in about 20 minutes from start of titration and should consume a total of 20–24 ml stock acid solution.

H. The slurry is digested for 20 additional minutes with gentle stirring.

I. Solids are removed by filtering, washed in hot water and oven dried.

The four key steps are B, C, D, and F as they provide the controls necessary to generate narrow PSD material with a predetermined crystal habit and a controlled particle size.

To form other of the crystal habits of monetite, steps D, E, F, and G are modified by the figures of Table I. For example, to form rhombohedral (diamond) crystals, the temperature in step D will be 85°C. In step E, titration will be continued to a pH of ≤ 3.0. In this particular instance, the reaction will be complete when titration lowers pH permanently below 3.0 (step G).

It will be seen from the above that there is herein provided a new and novel method for controlling the crystal habit, PSD and size of monetite crystals converted from brushite. It is economical and controllable and provides a distinct advance in the art.

While there have been shown what are at present considered to be the preferred embodiments of the invention, it will be apparent to those skilled in the art that various changes and modifications can be made therein without departing from the scope of the invention as defined by the appended claims.

What is claimed is:

1. A method of converting brushite to monetite crystals of substantially a single crystal habit, said method including isothermal and iso-pH control and consisting of the steps of: forming a brushite slurry containing about 10% solids by weight and having a first pH adjusted to about 4.5; placing said slurry in a container having stirring provision; adjusting said slurry to a second pH of about 9; heating said slurry to a final temperature of substantially 85°C while adjusting and maintaining said slurry at a third pH of 5.5 ± 0.2 and maintaining said pH and said temperature for 2 to 3 minutes with continuous stirring; adjusting said slurry to a fourth pH of 3.0 ± 0.1; digesting said slurry for about 20 minutes with gentle stirring to form a precipitate of said substantially single crystal habit, said single crystal habit being rhombohedral (diamond) monetite crystal having a basal plane acute angle of approximately 83°.

2. A method of converting brushite to monetite crystals of substantially a single crystal habit, said method including isothermal and iso-pH control and consisting of the steps of: forming a brushite slurry containing about 10% solids by weight and having a first pH adjusted to about 4.5; placing said slurry in a container having stirring provision; adjusting said slurry to a second pH of about 9; heating said slurry to a final temperature of substantially 88°C while adjusting and maintaining said slurry at a third pH of 5.5 ± 0.2 and maintaining said pH and said temperature for 2 to 3 minutes with continuous stirring; adjusting said slurry to a fourth pH of 3.0 to 3.5; digesting said slurry for about 20 minutes with gentle stirring to form a precipitate of said substantially single crystal habit, said single crystal habit being rhombohedral (plate) monetite crystal having a basal plane acute angle of 84° to 63°.

3. A method of converting brushite to monetite crystals of substantially a single crystal habit, said method including isothermal and iso-pH control and consisting of the steps of: forming a brushite slurry containing about 10% solids by weight and having a first pH adjusted to about 4.5; placing said slurry in a container having stirring provision; adjusting said slurry to a second pH of about 9; heating said slurry to a final temperature of substantially 92°C while adjusting and maintaining said slurry at third pH of 5.5 ± 0.2 and maintaining said pH and said temperature for 2 to 3 minutes with continuous stirring; adjusting said slurry to a fourth pH of 3.5; digesting said slurry for about 20 minutes with gentle stirring to form a preciptitate of said substantially single crystal habit, said single crystal habit being thin rectangular (plate) monetite crystal having a basal plane acute angle of approximately 84°.

4. A method of converting brushite to monetite crystals of substantially a single crystal habit, said method including isothermal and iso-pH control and consisting of the steps of: forming a brushite slurry containing about 10% solids by weight and having a first pH adjusted to about 4.5; placing said slurry in a container having stirring provision; adjusting said slurry to a second pH of about 9; heating said slurry to a final temperature of substantailly 98°C while adjusting and maintaining said slurry at a third pH of 5.5 ± 0.2 and maintaining said pH and said temperature for 2 to 3 minutes with continuous stirring; adjusting said slurry to a fourth pH of ≥ 4.0; digesting said slurry for about 20 minutes with gentle stirring to form a precipitate of said substantially single crystal habit; said single crystal habit being rectangular (needle) monetite crystal having a basal plane acute angle of approximately 90°.

* * * * *